(12) United States Patent
Yang (10) Patent No.: US 12,267,571 B2
(45) Date of Patent: Apr. 1, 2025

(54) CAMERA MODULE AND ELECTRONIC DEVICE

(71) Applicant: VIVO MOBILE COMMUNICATION CO., LTD., Dongguan (CN)

(72) Inventor: Zuokun Yang, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 209 days.

(21) Appl. No.: 18/203,358

(22) Filed: May 30, 2023

(65) Prior Publication Data

US 2023/0308734 A1   Sep. 28, 2023

Related U.S. Application Data

(63) Continuation of application No. PCT/CN2021/137353, filed on Dec. 13, 2021.

(30) Foreign Application Priority Data

Dec. 17, 2020   (CN) .......................... 202011497271.4

(51) Int. Cl.
   *H04N 23/54*   (2023.01)
   *H04N 23/51*   (2023.01)
   *H04N 23/68*   (2023.01)

(52) U.S. Cl.
   CPC ............. *H04N 23/54* (2023.01); *H04N 23/51* (2023.01); *H04N 23/685* (2023.01)

(58) Field of Classification Search
   CPC ...... H04N 23/54; H04N 23/51; H04N 23/685; H04N 23/55; H04N 23/687; G02B 27/646; G03B 30/00
   See application file for complete search history.

(56) References Cited

U.S. PATENT DOCUMENTS

| 8,928,985 | B2 | 1/2015 | Nakayama et al. | |
| 10,126,563 | B2 | 11/2018 | Yu et al. | |
| 11,463,607 | B2 * | 10/2022 | Moon | G03B 5/00 |
| 11,500,221 | B2 | 11/2022 | Takei | |
| 2005/0225646 | A1 * | 10/2005 | Shintani | G03B 5/00 348/208.99 |
| 2007/0237507 | A1 | 10/2007 | Iijima et al. | |
| 2018/0364441 | A1 | 12/2018 | Hubert et al. | |
| 2021/0124145 | A1 | 4/2021 | Zhang | |

(Continued)

FOREIGN PATENT DOCUMENTS

| CN | 108674366 A | 10/2018 |
| CN | 108696687 A | 10/2018 |

(Continued)

*Primary Examiner* — Nicholas G Giles
(74) *Attorney, Agent, or Firm* — The Webb Law Firm (57) ABSTRACT

A camera module includes a camera, a first bracket, a second bracket, a first driving portion, and a second driving portion. The camera is disposed on the first bracket. The first driving portion is located on the second bracket and connected to the camera. The second driving portion is connected to the first bracket. The first bracket is rotatably connected to the second bracket. The first driving portion is able to drive the camera to rotate around a first axis relative to the first bracket. The second driving portion is able to drive the first bracket and the camera to rotate around a second axis relative to the second bracket.

20 Claims, 11 Drawing Sheets

(56) References Cited

U.S. PATENT DOCUMENTS

| | | | |
|---|---|---|---|
| 2021/0218866 A1* | 7/2021 | Moon | H04N 23/695 |
| 2022/0224806 A1 | 7/2022 | Lu et al. | |
| 2022/0224807 A1 | 7/2022 | Lu et al. | |

FOREIGN PATENT DOCUMENTS

| | | |
|---|---|---|
| CN | 109379529 A | 2/2019 |
| CN | 110572556 A | 12/2019 |
| CN | 110673656 A | 1/2020 |
| CN | 110677567 A | 1/2020 |
| CN | 111212215 A | 5/2020 |
| CN | 211266959 U | 8/2020 |
| CN | 111917966 A | 11/2020 |
| CN | 112083617 A | 12/2020 |
| CN | 112492218 A | 3/2021 |
| CN | 112822354 A | 5/2021 |
| JP | 2000010139 A | 1/2000 |
| JP | 2008191615 A | 8/2008 |
| JP | 2013140285 A | 7/2013 |
| JP | 2015129855 A | 7/2015 |
| JP | 2017010012 A | 1/2017 |
| KR | 1020100109125 A | 10/2010 |
| WO | 2020010886 A1 | 1/2020 |
| WO | 2020071852 A1 | 4/2020 |

* cited by examiner

CAMERA MODULE AND ELECTRONIC DEVICE

CROSS-REFERENCE TO RELATED APPLICATIONS

This application is a Bypass Continuation Application of International Application No. PCT/CN2021/137353, filed Dec. 13, 2021, and claims priority to Chinese Patent Application No. 202011497271.4, filed Dec. 17, 2020, the disclosures of which are hereby incorporated by reference in their entireties.

BACKGROUND OF THE INVENTION

Field of the Invention

This application relates to the technical field of communications devices, and in particular, to a camera module and an electronic device.

Description of Related Art

Higher requirements of users are promoting continuous performance optimization of electronic devices. Notably, the shooting performance of current electronic devices keeps improving. In a shooting process of an electronic device, the shake of the electronic device caused by hand-holding of a user impairs the shooting quality. To solve this problem, a camera module in the electronic device in the related art provides an image stabilization function, and stabilizes an image through an OIS optical image stabilization technology. In a working process, the only way of image stabilization based on the OIS image stabilization technology is to move the camera module in three directions: an X-axis (a direction of an optical axis of the camera module), a Y-axis, and a Z-axis (a plane defined by the Y-axis and the Z-axis is perpendicular to the direction of the optical axis of the camera module). However, the OIS optical image stabilization technology incurs a problem of a poor effect of image stabilization, and results in poor quality of an image captured by the camera module.

SUMMARY OF THE INVENTION

This application discloses a camera module and an electronic device.

According to a first aspect, this application discloses a camera module, including a camera, a first bracket, a second bracket, a first driving portion, and a second driving portion. The camera is disposed on the first bracket. The first driving portion is located on the second bracket and connected to the camera. The second driving portion is connected to the first bracket. The first bracket is rotatably connected to the second bracket. The first driving portion is able to drive the camera to rotate around a first axis relative to the first bracket. The second driving portion is able to drive the first bracket and the camera to rotate around a second axis relative to the second bracket. The first axis and the second axis are non-coplanar straight lines or intersecting straight lines.

According to a second aspect, this application discloses an electronic device, including the camera module.

REFERENCE NUMERALS

100—camera, 110—camera body, 120—camera cover, 121—third connecting hole, 122—third hinge shaft, 123—mounting hole
200—first bracket, 210—first connecting hole, 220—arcuate hole, 230—second connecting hole
300—second bracket, 310—first accommodation groove, 320—second accommodation groove
400—first driving portion
500—second driving portion, 510—first driving motor, 520—first connecting shaft, 530—I-shaped bracket, 540—hinge
600—connecting block, 610—base, 620—first hinge shaft, 630—second hinge shaft
700—third bracket, 710—first strip-shaped avoidance hole
800—third driving portion, 810—second driving motor, 820—second connecting shaft,
830—gear mechanism, 831—first bevel gear, 832—second bevel gear, 833—third gear
900—rolling body
1000—fixing base, 1100—first housing portion, 1110—second strip-shaped avoidance hole,
1120—supporting platform, 1130—protective cover, 1140—third connecting shaft, 1200—second housing portion
Y—first axis, Z—second axis, X—third axis, Z'—fourth axis

DESCRIPTION OF THE INVENTION

To make the objectives, technical solutions, and advantages of the present application clearer, the following describes the technical solutions of the present application clearly with reference to embodiments of the present application and the corresponding drawings. Evidently, the described embodiments are merely a part of but not all of the embodiments of the present application. All other embodiments derived by a person of ordinary skill in the art based on the embodiments of the present application fall within the protection scope of the present application.

With reference to drawings, the following describes in detail the technical solution disclosed in each embodiment of this application.

Figure 1:
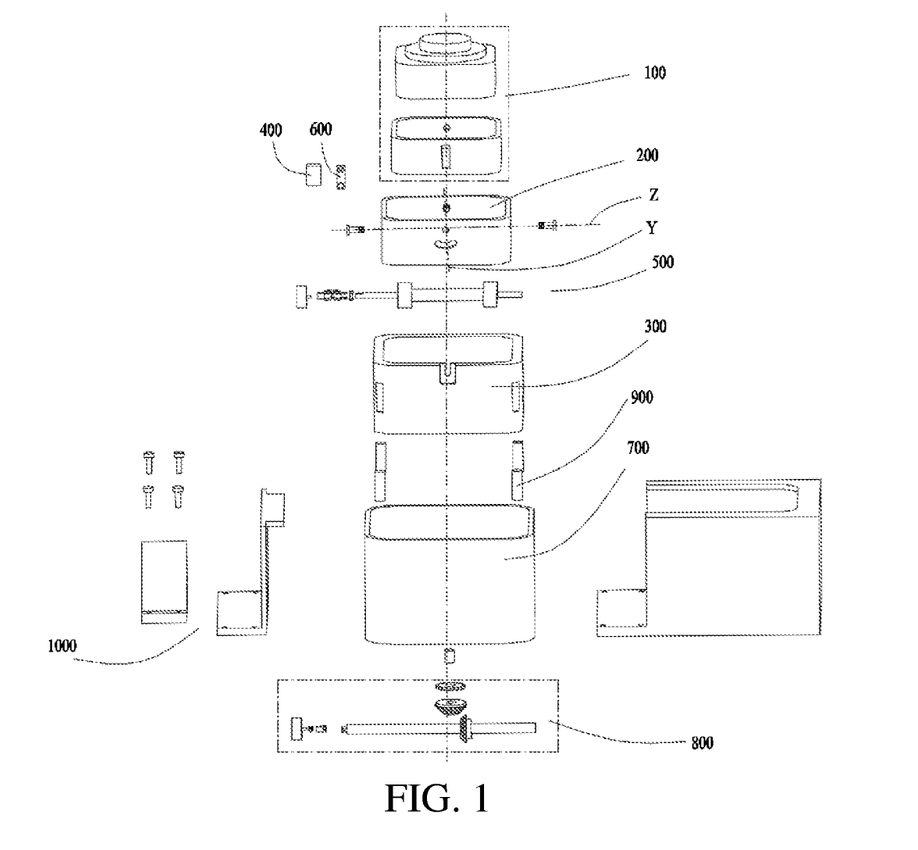
FIG. 1 is an exploded view of a camera module according to an embodiment of this application.

In some embodiments, a camera module shown in FIG. 1 includes a camera 100, a first bracket 200, a second bracket 300, a first driving portion 400, and a second driving portion 500.

Figure 2:
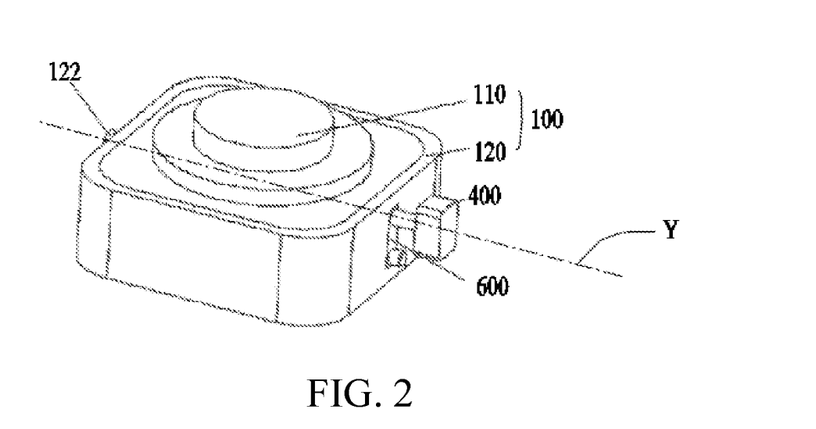
FIG. 2 is a partial structural diagram of a camera according to an embodiment of this application.
Figure 5:
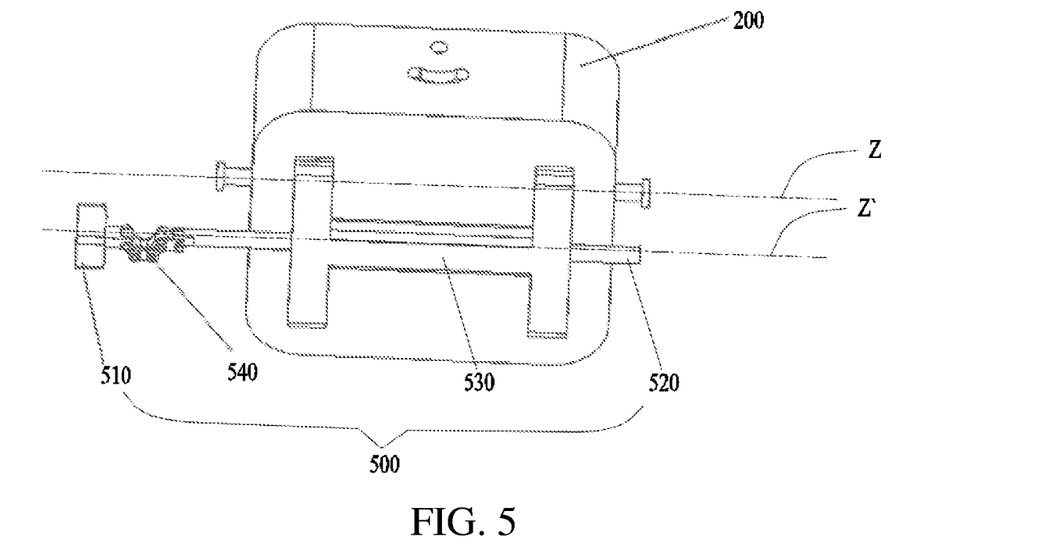
FIG. 5 is a diagram of a connection relationship between a first bracket and a second driving portion according to an embodiment of this application.
Figure 14:
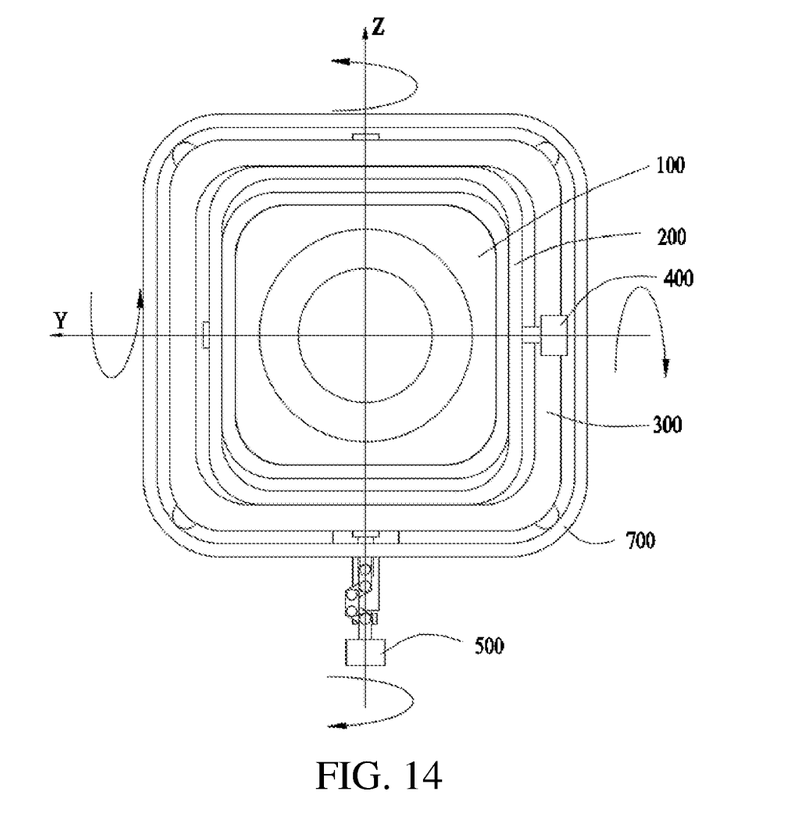
FIG. 14 is a schematic diagram of adjusting a camera module by rotating around a first axis or a second axis according to an embodiment of this application.

As shown in FIG. 2, FIG. 5, and FIG. 14, the camera 100 is disposed on the first bracket 200. The first driving portion 400 is located on the second bracket 300 and connected to the camera 100. The second driving portion 500 is connected to the first bracket 200. The first bracket 200 is rotatably connected to the second bracket 300.

Figure 6:
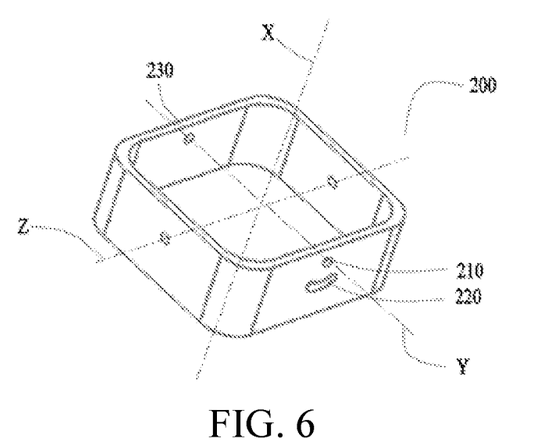
FIG. 6 is a structural diagram of a first bracket according to an embodiment of this application.
Figure 8:
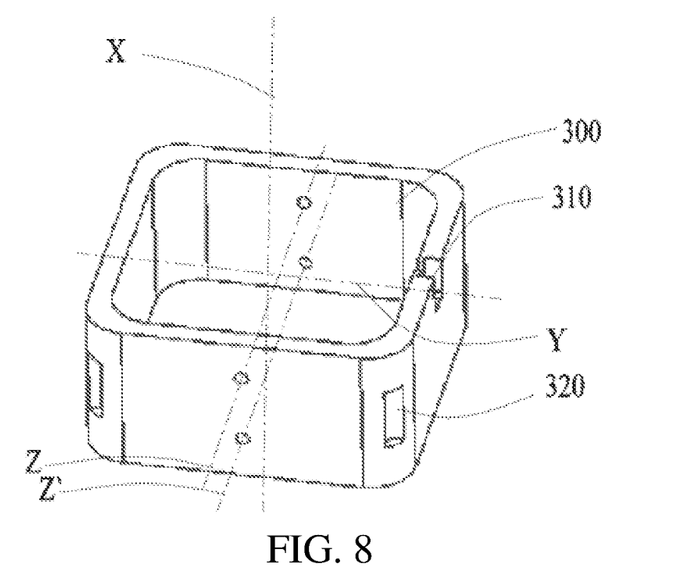
FIG. 8 is a structural diagram of a second bracket according to an embodiment of this application.

As shown in FIG. 6 and FIG. 8, in some assembling solutions, both the first bracket 200 and the second bracket 300 may be of a cover-like and shell-like structure. The second bracket 300 sheathes the first bracket 200, the first bracket 200 sheathes the camera 100, and a clearance is maintained between the second bracket and the first bracket, and between the first bracket and the camera to ensure smooth rotation.

As shown in FIG. 1 and FIG. 2, in a process of shooting an image by using the camera module, the camera 100 may be driven by the first driving portion 400 so that the camera 100 rotates around a first axis Y relative to the first bracket 200. By rotating around the first axis Y, the camera 100 implements image stabilization.

As shown in FIG. 1 and FIG. 5, in the process of shooting an image by using the camera module, the second driving portion 500 may be actuated so that the first bracket 200 and the camera 100 as a whole are driven by the second driving portion 500. In this way, the first bracket 200 and the camera 100 rotate around a second axis Z relative to the second bracket 300. By rotating around the second axis Z, the camera 100 implements image stabilization.

The first axis Y and the second axis Z are non-coplanar straight lines or intersecting straight lines. In this way, the camera 100 implements the image stabilization function by adjusting the rotation degree of freedom in two directions. During shooting, the camera 100 rotates around the first axis Y or the second axis Z to stabilize images during the shooting and ensure quality of final images. As an optional solution, the first axis Y is perpendicular to the second axis Z so that it is easier to control the rotation of the camera 100 to implement image stabilization.

Figure 4:
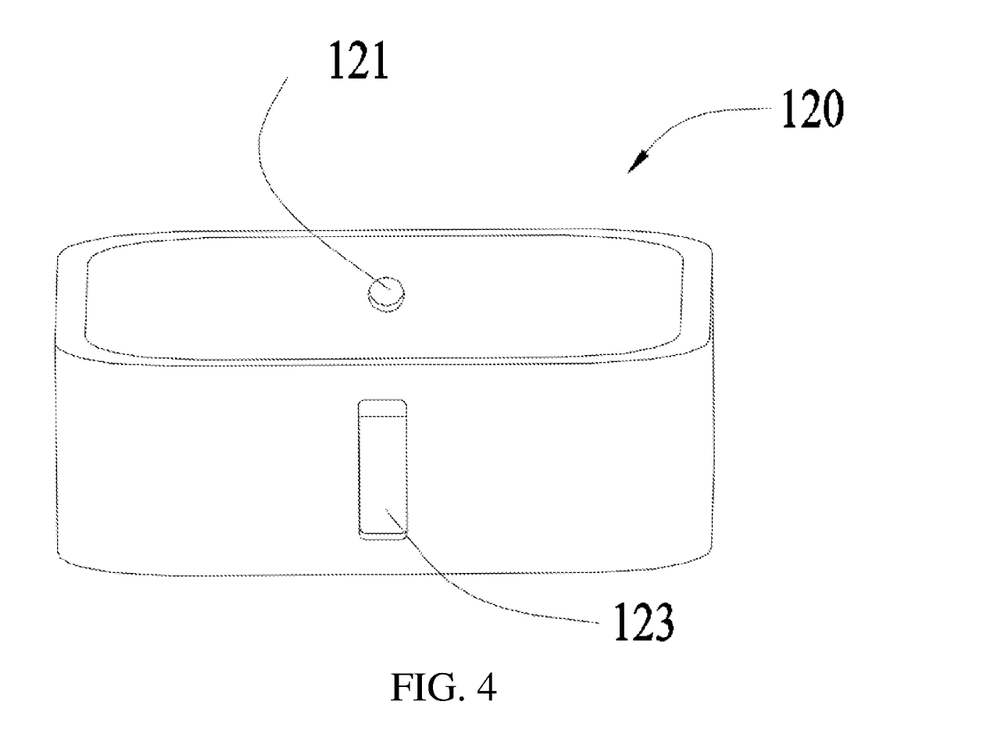
FIG. 4 is a structural diagram of a camera cover according to an embodiment of this application.

Optionally, as shown in FIG. 2 and FIG. 4, the camera 100 is used as an imaging component of the camera module. A main core component of the camera is a camera body 110. The camera body 110 is sheathed in a camera cover 120 so that the camera cover 120 serves a shielding and protective function for the camera body 110.

In addition, it is hereby pointed out that both the first driving portion 400 and the second driving portion 500 may be of a motor structure. During actual assembling, a motor shaft of the first driving portion 400 may be connected to the camera 100 along the first axis Y by means of shaft bossing, and a motor shaft of the second driving portion 500 may be connected to the first bracket 200 along the second axis Z by means of shaft bossing.

Figure 7:
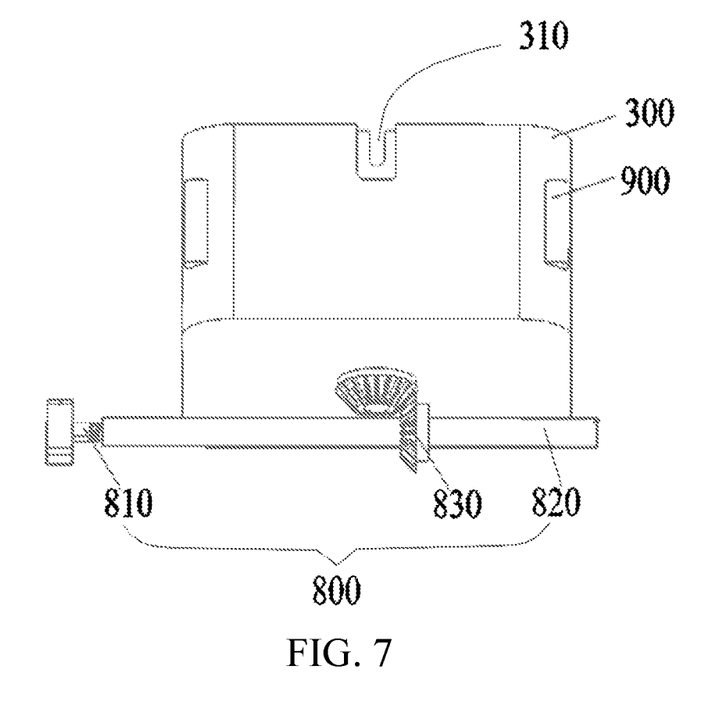
FIG. 7 is a diagram of a connection relationship between a second bracket and a third driving portion according to an embodiment of this application.

Optionally, as shown in FIG. 2, FIG. 7, and FIG. 8, the second bracket 300 may include a first accommodation groove 310. The first driving portion 400 is located in the first accommodation groove 310 and connected to the camera 100. Optionally, the first accommodation groove 310 may be opened along the first axis Y. The first driving portion 400 is accommodated in the first accommodation groove 310 along the first axis Y through the opening.

When the camera 100 performs image stabilization by rotating around the first axis Y, the first accommodation groove 310 constrains the degree of freedom of the first driving portion 400 to prevent the first driving portion 400 from rotating around the first axis Y, from moving in a plane perpendicular to the first axis Y, and from incurring other circumstances. In this way, the first driving portion 400 in a stationary state drives the camera 100 to rotate around the first axis Y.

When the camera 100 performs image stabilization by rotating around the second axis Z, the second driving portion 500 drives the first bracket 200 to rotate together with the camera 100. At this time, the first accommodation groove 310 allows the first driving portion 400 to rotate around the second axis Z along with the first bracket 200, and the first driving portion 400 moves into the first accommodation groove 310 or moves out of the first accommodation groove 310 through the opening of the first accommodation groove 310.

To sum up, the first accommodation groove 310 is opened along the first axis Y, and the first driving portion 400 is accommodated in the first accommodation groove 310. Under such design, the first driving portion 400 may serve as a driver to drive, in a stationary state, the camera 100 to rotate around the first axis Y; and the first driving portion 400 may serve as a follower to, in a moving state, rotate around the second axis Z along with the camera 100. In this way, the driving manner of the first driving portion 400 and the second driving portion 500 to drive the camera 100 is more reasonable and effective, and makes the structure more compact.

It is hereby noted that, as an alternative, in order to implement the first driving portion 400 and the above functions, the first driving portion 400 may be hinged on the second bracket 300, and a hinge shaft between the first driving portion and the second bracket is in the same direction as the second axis Z. In this way, the following effect is achieved: the first driving portion 400 is stationary when serving as a driver and is moving when serving as a follower. As another alternative, the first accommodation groove 310 may be replaced by two barrier strips spaced apart along the second axis Z. The first driving portion 400 is disposed between the two barrier strips, thereby also achieving the above effect.

Figure 3:
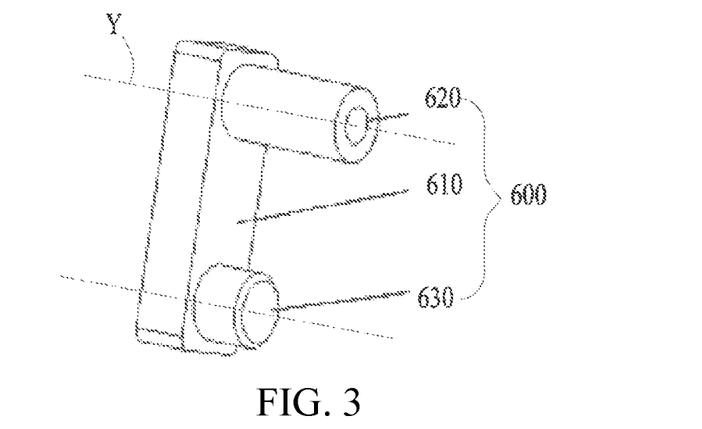
FIG. 3 is a structural diagram of a connecting block according to an embodiment of this application.

In some embodiments, as shown in FIG. 2, FIG. 3, and FIG. 6, the camera 100 may be rotatably in fit with the first bracket 200 through a connecting block 600. The connecting block 600 includes a base 610 and a first hinge shaft 620. The base 610 is mounted on the camera 100. The first hinge shaft 620 is disposed on the base 610. The first bracket 200 is provided with a first connecting hole 210. The first hinge shaft 620 is rotatably in fit with the first connecting hole 210, and connected to the first driving portion 400 by passing through the first connecting hole 210. In this way, the first driving portion 400 drives, through the first hinge shaft 620, the camera 100 to rotate around the first axis Y, and the driving manner is more reasonable.

Optionally, as shown in FIG. 3 and FIG. 6, the first bracket 200 may be provided with an arcuate hole 220. The connecting block 600 may further include a second hinge shaft 630. The second hinge shaft 630 is fixed onto the base 610. The second hinge shaft 630 is slidably in fit with the arcuate hole 220. The second hinge shaft 630 is in limiting fit with two ends of the arcuate hole 220. With the position limited by the arcuate hole 220, the stroke of the second hinge shaft 630 is controlled. Further, an angle by which the camera 100 rotates around the first axis Y is controlled by the connecting block 600, so as to avoid excessive rotation.

Optionally, the arcuate hole 220 is an arc segment formed by gyrating around the first axis Y. A circle center of the first connecting hole 210 is located on the first axis Y. In this way, the arcuate hole 220 may fit with the first connecting hole 210 to constrain the motion of the connecting block 600. Therefore, a trajectory of the camera 100 rotating around the first axis Y is more circular, the gyration of the camera 100 is controlled more effectively, and the precision of rotation control is improved.

In addition, it is hereby pointed out that, as an alternative, the arcuate hole 220 may be replaced by two symmetrically arranged limiting blocks located on the inner wall of the first bracket 200. The second hinge shaft 630 is located between the two limiting blocks. The position limiting performed by the two limiting blocks on the second hinge shaft 630 can also control the angle by which the camera 100 rotates around the first axis Y.

In some implementation solutions, as shown in FIG. 2, FIG. 4, and FIG. 6, the first bracket 200 is further provided with a second connecting hole 230. The second connecting hole 230 is coaxial with the first connecting hole 210. The camera 100 is provided with a third connecting hole 121. The camera 100 includes a third hinge shaft 122. The third hinge shaft 122 and the first hinge shaft 620 are located on two opposite sides of the camera 100 respectively. The third hinge shaft 122 passes through the second connecting hole 230 and the third connecting hole 121, and is coaxial with the first hinge shaft 620. The first bracket 200 is rotatably in fit with the camera 100 through the third hinge shaft 122.

In this way, the third hinge shaft 122 and the first hinge shaft 620 is equivalent to a combined shaft that runs through the camera 100 and that is disposed along the first axis Y. The combined shaft is integrated with the camera 100 to form a whole. In this way, the camera 100 hangs on the first bracket 200 and is rotatably in fit with the second connecting hole 230 through the third hinge shaft 122, and is rotatably in fit with the first connecting hole 210 through the first hinge shaft 620. In this way, the camera 100 can rotate more smoothly around the first axis Y relative to the first bracket 200, and the camera 100 is supported more uniformly.

Optionally, the third hinge shaft 122 is detachably connected to the camera 100, and is plugged and fixed onto the camera 100 by passing through the second connecting hole 230 and the third connecting hole 121, so as to facilitate disassembly and assembly of the camera 100 on the first bracket 200. In addition, as an optional solution of this application, the third hinge shaft 122 may be formed on the camera 100 in one piece.

The first connecting hole 210 and the second connecting hole 230 are round holes in this application. As an alternative, the first connecting hole and the second connecting hole may be U-shaped holes. Open ends of the U-shaped holes are located at the top of the first bracket 200. During assembling, the third hinge shaft 122 and the first hinge shaft 620 may be placed into the U-shaped holes through the open ends of the corresponding U-shaped holes, so that the camera 100 is positioned in the first bracket 200.

Optionally, as shown in FIG. 4, the camera 100 may be provided with a mounting hole 123. The base 610 is fixed in the mounting hole 123 so that the connecting block 600 is fixed to the camera 100 more firmly. As an alternative, the mounting hole 123 may be replaced by two barrier strips or blocks spaced apart on the camera 100 along the second axis Z, and the base 610 is fixed between the two barrier strips or blocks spaced apart, thereby also enhancing the effect of fixing between the connecting block 600 and the camera 100.

In some implementation solutions, as shown in FIG. 4, the mounting hole 123 and the third connecting hole 121 are disposed opposite to each other in the camera cover 120. The third hinge shaft 122 passes through the third connecting hole 121, and is fixed onto the camera body 110. The base 610 passes through the mounting hole 123, and is also fixed onto the camera body 110.

In some embodiments, as shown in FIG. 5, the second driving portion 500 includes a first driving motor 510, a first connecting shaft 520, and an I-shaped bracket 530. The first driving motor 510 is connected to the first connecting shaft 520. The I-shaped bracket 530 is fixed onto the first connecting shaft 520, and is connected to the bottom of the first bracket 200. For example, the I-shaped bracket 530 is fixedly disposed at the bottom of the first bracket 200 by bonding, welding, and the like. Alternatively, the I-shaped bracket 530 is fixed to the first connecting shaft 520, and closely fits with the first bracket 200. In this way, by actuating the second driving portion 500, a torque output by the second driving portion 500 is transmitted to the I-shaped bracket 530 through the first connecting shaft 520. Anchor plates on two wings of the I-shaped bracket 530 enable the I-shaped bracket 530 to output a torque to the first bracket 200, thereby driving the first bracket 200 to rotate around the second axis Z.

Figure 5A:
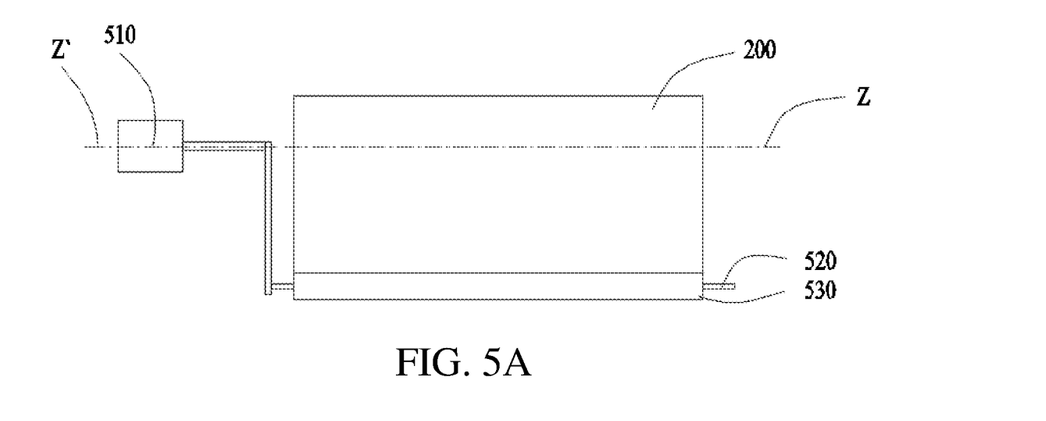
FIG. 5A is a diagram of another connection relationship between a first bracket and a second driving portion according to an embodiment of this application.

It is hereby pointed out that the rotation shaft of the first driving motor 510 is a fourth axis Z'. Therefore, the fourth axis Z' needs to remain stationary along with the first driving motor 510. Other components of the second driving portion 500 such as the first connecting shaft 520 and the I-shaped bracket 530 will rotate around the second axis Z along with the first bracket 200. Therefore, the first driving motor 510 is connected by transmission to the first connecting shaft 520. The form of the driving connection may be: as shown in FIG. 5A, the fourth axis Z' is coaxial with the second axis Z, and an adapter disc is disposed at an output end of the first driving motor 510. At a circle center of the adapter disc, the adapter disc is connected to the output shaft of the first driving motor 510. At a position near the edge on the adapter disc, the adapter disc is connected to the first connecting shaft 520. In this way, the first driving motor 510 can transmit the torque to the first connecting shaft 520 through the adapter disc, and make the first connecting shaft 520 rotate around the second axis Z along with the first bracket 200. Alternatively, the adapter disc may be replaced by an adapter shaft. Two ends of the adapter shaft are connected to the output shaft of the first driving motor 510 and the first connecting shaft 520 respectively, thereby also making the first connecting shaft 520 rotate around the second axis Z. In this case, a gyroradius of the first connecting shaft 520 is a length dimension of the adapter shaft.

Figure 9:
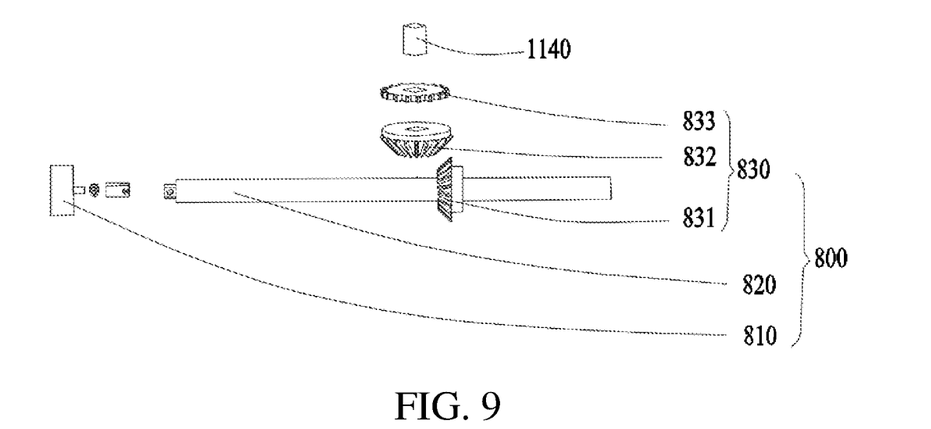
FIG. 9 is an exploded view of a third driving portion according to an embodiment of this application.
Figure 11:
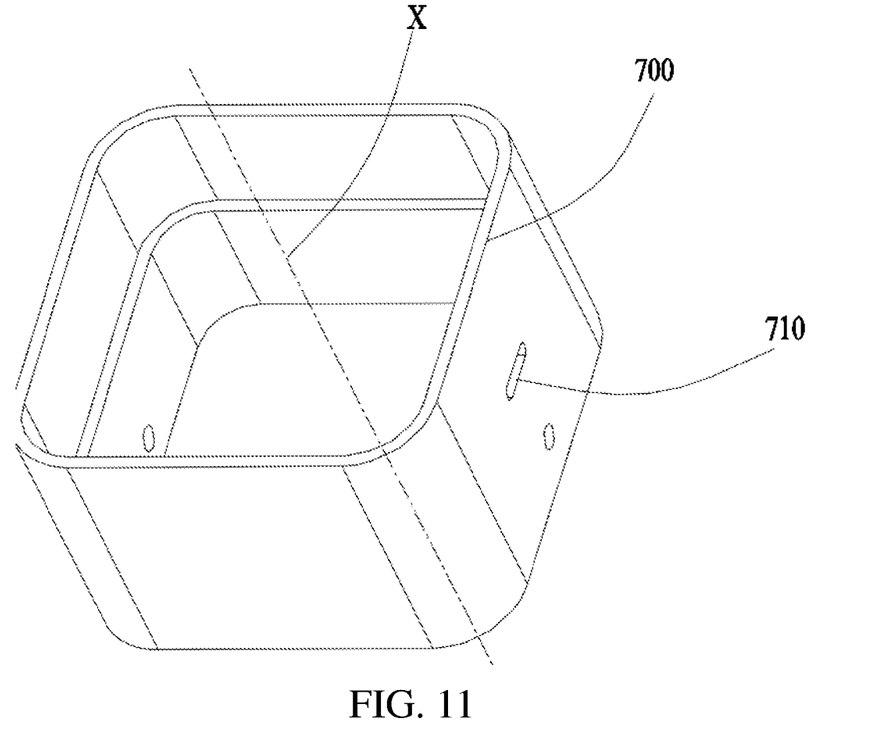
FIG. 11 is a structural diagram of a third bracket according to an embodiment of this application.
Figure 15:
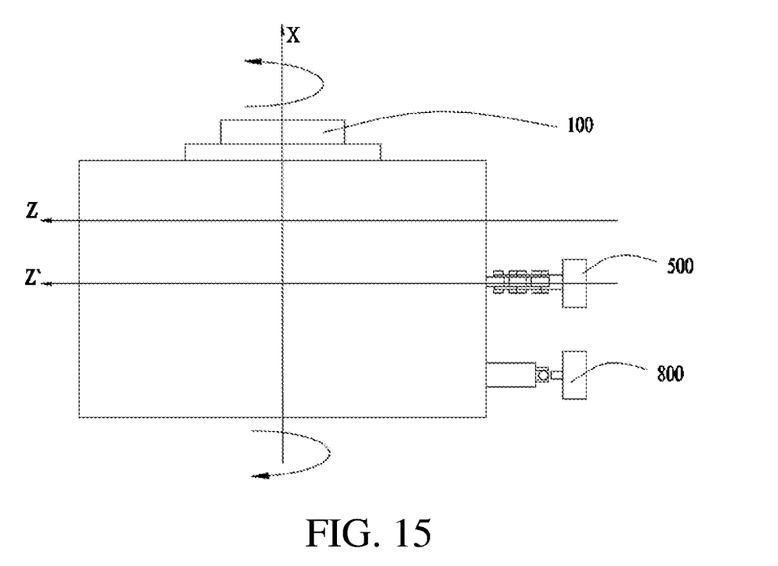
FIG. 15 is a schematic diagram of adjusting a camera module by rotating around a third axis according to an embodiment of this application.

In some embodiments, as shown in FIG. 1, FIG. 9, and FIG. 11, the camera module may further include a third bracket 700 and a third driving portion 800. The second bracket 300 is disposed on the third bracket 700. The third driving portion 800 is connected to the second bracket 300. The third driving portion 800 drives the second bracket 300 to rotate around the third axis X relative to the third bracket 700. The camera 100 may rotate around the third axis X along with the second bracket 300. Every two of the first axis Y, the second axis Z, or the third axis X are non-coplanar straight lines or intersecting straight lines. In this way, as shown in FIG. 14 and FIG. 15, the camera 100 can implement image stabilization by adjusting the rotation degree of freedom in the three different directions. The image stabilization is more effective, and the shooting quality of images captured by a camera device according to this application is higher.

As an optional layout solution, the third axis X is coaxial with the optical axis of the camera 100, and every two of the first axis Y, the second axis Z, or the third axis X are perpendicular to each other, so that the image stabilization manner of the camera 100 is more reasonable.

Optionally, the third driving portion 800 may be a motor. An output shaft of the motor is connected to the second bracket 300 by means of shaft bossing, so as to enable the second bracket 300 to rotate around the third axis X. Alternatively, the third driving portion 800 may be a plurality of rollers powered by a motor mounted in the third bracket 700. The periphery of the rollers closely fits with the outer periphery of the second bracket 300. The rotation of the rollers drives the second bracket 300 to rotate around the third axis X.

In some implementation solutions, as shown in FIG. 1 and FIG. 7, at least two rolling bodies 900 may be disposed between the third bracket 700 and the second bracket 300. The second bracket 300 is rotatably connected to the third bracket 700 through the at least two rolling bodies 900. In this way, the rolling bodies 900 serve as a rolling medium between the second bracket and the third bracket, thereby making the second bracket 300 rotate more smoothly around the third axis X relative to the third bracket 700, and alleviating abrasion. Optionally, the rolling bodies 900 may be designed as balls and rollers, or may be bearings.

Optionally, the second bracket 300 or the third bracket 700 is provided with at least two second accommodation grooves 320. Each of the rolling bodies 900 is disposed in one of the second accommodation grooves 320.

Optionally, both the third bracket 700 and the second bracket 300 are of a box structure, and four angular corners of the box are filleted. The second accommodation groove 320 is disposed on the fillet of the third bracket 700 or the second bracket 300. There are a total of four rolling bodies 900 that are arranged annularly around the third axis X. One rolling body is disposed on each second accommodation groove 320. This structure ensures that the space between the camera modules is more compact in a case of fitting with each other by rolling.

Figure 10:
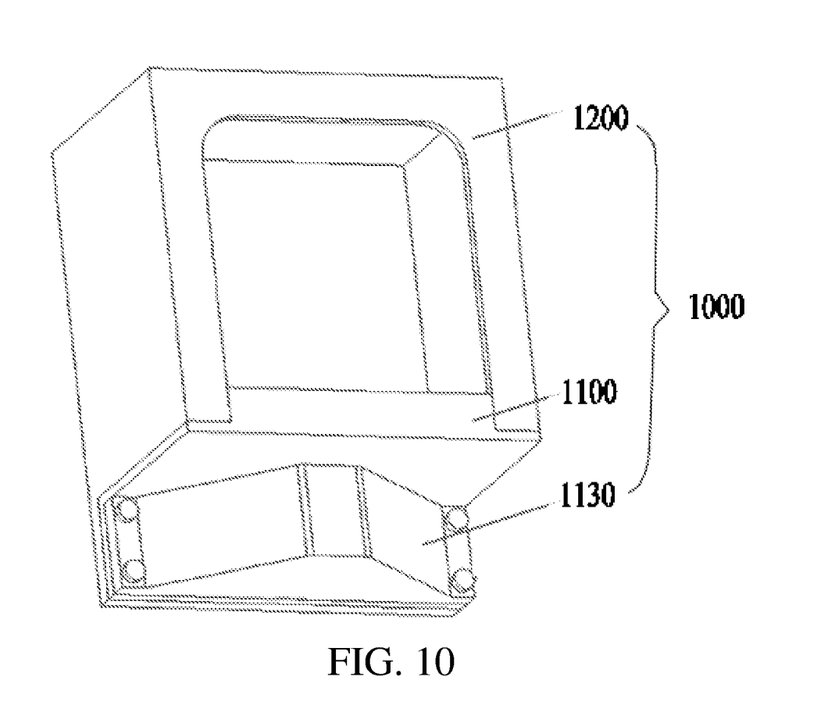
FIG. 10 is a structural diagram of a fixing base according to an embodiment of this application.
Figure 13:
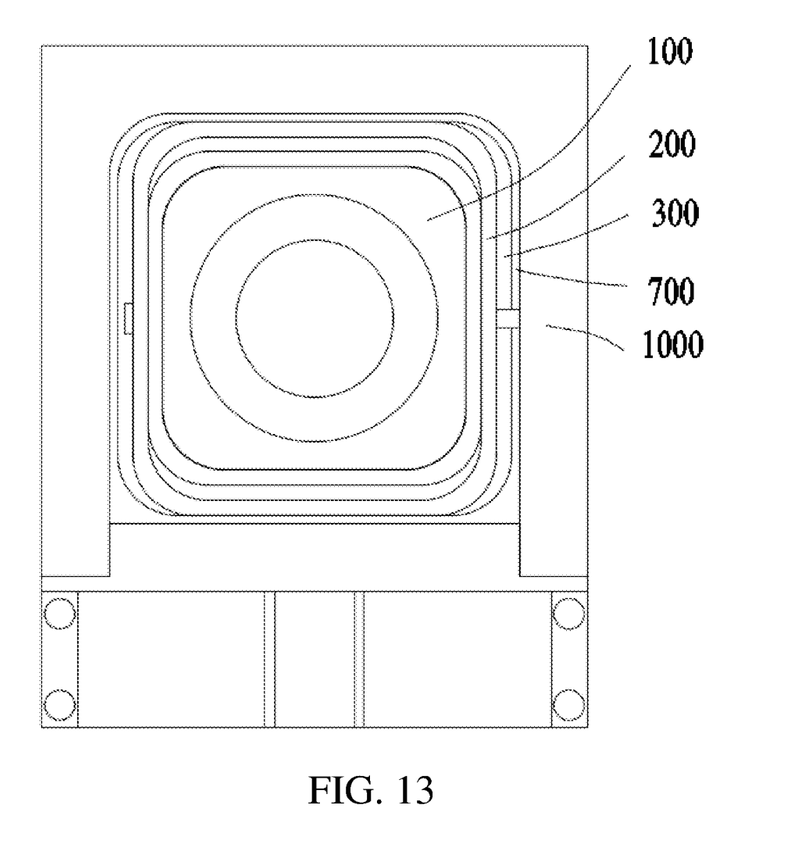
FIG. 13 is a structural top view of a camera module according to an embodiment of this application.

In some implementation solutions, as shown in FIG. 10 and FIG. 13, the camera module further includes a fixing base 1000. The third bracket 700 is mounted on the fixing base 1000.

As shown in FIG. 5 and FIG. 14, the first driving motor 510 is connected by transmission to the first connecting shaft 520 by a hinge 540. A hinge shaft of the hinge 540 is parallel to the optical axis direction of the camera 100, that is, the third axis X. The first driving motor 510 is fixed onto the fixing base 1000, and is located outside the third bracket 700.

As shown in FIG. 11 and FIG. 14, the third bracket 700 is provided with a first strip-shaped avoidance hole 710. The hinge 540 passes through the first strip-shaped avoidance hole 710, and is connected to the first connecting shaft 520 located in the third bracket 700.

As shown in FIG. 5 and FIG. 6, the first driving motor 510 together with the first connecting shaft 520 may be disposed at the bottom of the first bracket 200. The second axis Z and the fourth axis Z' are parallel but not coaxial. In this way, when the first driving motor 510 is actuated, by virtue of the characteristic that the hinge shaft of the hinge 540 is parallel to the third axis X, the hinge 540 is caused to be rigid in a direction parallel to the third axis X, and in turn, the driving motor 510 can transmit a torque to the first connecting shaft 520 through the hinge 540. At the same time, the hinge 540 is flexible in a direction perpendicular to the second axis Z. In this way, in a case that the driving motor 510 keeps stationary, the driving motor drives the first connecting shaft 520 to rotate around the second axis Z, and in turn, causes the first bracket 200 to rotate around the second axis Z. In this case, the hinge 540 may deform along with the rotation of the first bracket 200, so as to change the relative position between the driving motor 510 and the first connecting shaft 520.

In addition, it is hereby pointed out that, by virtue of the flexibility of the hinge 540, when the third driving portion 800 is actuated, the second bracket 300 rotates around the optical axis of the camera 100, that is, the third axis X. In this case, the hinge 540 may deform along with the rotation of the second bracket 300, so as to change the relative position between the driving motor 510 and the first connecting shaft 520. It is hereby noted that the first strip-shaped avoidance hole 710 is made for the purpose of reserving sufficient space for deformation of the hinge 540, and enabling the hinge to deform sufficiently.

In some implementation solutions, as shown in FIG. 10 and FIG. 13, the fixing base 1000 is a housing structure. The fixing base 1000 includes a first housing portion 1100 and a second housing portion 1200. The first housing portion 1100 is docked to the second housing portion 1200 to form an accommodation cavity. The third bracket 700 is located in the accommodation cavity. The second bracket 300 is located in the third bracket 700. The first bracket 200 is located in the second bracket 300. The camera 100 is located in the first bracket 200. In this way, the fixing base 1000 can shield and protect internal parts and serve a dustproof and waterproof function.

Figure 12:
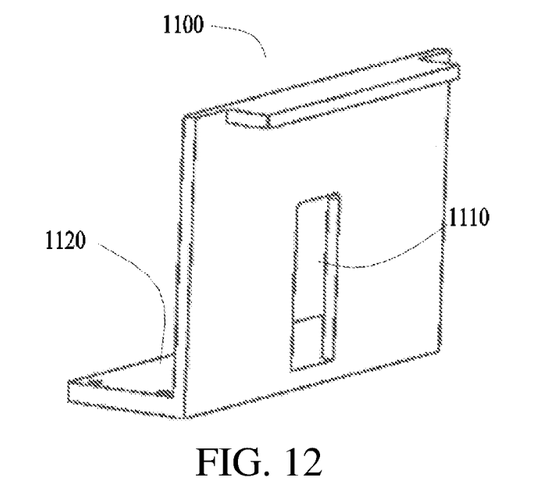
FIG. 12 is a structural diagram of a first housing portion according to an embodiment of this application.

In addition, as shown in FIG. 10 and FIG. 12, the first housing portion 1100 may be provided with a second strip-shaped avoidance hole 1110. A supporting platform 1120 may be disposed on an outer side of the first housing portion 1100. The supporting platform 1120 is covered with a protective cover 1130. The first driving motor 510 is located inside the protective cover 1130 to shield and protect the first driving motor 510. The hinge 540 passes through the second strip-shaped avoidance hole 1110 and the first strip-shaped avoidance hole 710 sequentially to get connected to the first connecting shaft 520. In this way, enough space is reserved in both the second strip-shaped avoidance hole 1110 and the first strip-shaped avoidance hole 710 to enable the hinge 540 to deform sufficiently.

In some embodiments, as shown in FIG. 9, the third driving portion 800 includes a second driving motor 810, a second connecting shaft 820, and a gear mechanism 830. The gear mechanism 830 includes a first bevel gear 831, a second bevel gear 832, and a third gear 833. The first bevel gear 831 is disposed on the second connecting shaft 820. A third connecting shaft 1140 coaxial with the third axis X is rotatably disposed on the fixing base 1000. The second connecting shaft 820 is perpendicular to the third connecting shaft 1140.

The second bevel gear 832 and the third gear 833 are fixed to each other, and are both rotatably connected to the third connecting shaft 1140. For example, the third connecting shaft 1140 may be a rotating sleeve in which a bearing is disposed. The first bevel gear 831 meshes with the second bevel gear 832. An inner ring gear is disposed on the third bracket 700. The third gear 833 meshes with the inner ring gear.

The second driving motor 810 drives, through the second connecting shaft 820, the gear mechanism 830 to rotate, and in turn, drives, through the third gear 833, the third bracket 700 to bring the camera 100 to rotate around the optical axis of the camera.

In this way, the design of the bevel gear pair implements reversing transmission, so as to make better use of the internal space of the camera module. In addition, it is hereby pointed out that, as an alternative, the gear mechanism 830 may be replaced by a chain transmission mechanism, a belt transmission mechanism, a worm gear mechanism, or the like.

This application further discloses an electronic device. The electronic device includes the camera module according to any one of the above embodiments of this application. The electronic device disclosed herein may be a mobile phone, a tablet computer, an e-book reader, a wearable device (such as smart glasses and smart watches), a game console, or the like, and may be other types of devices. The specific type of the electronic device is not limited herein.

The above embodiments of this application are described by focusing on the differences between the embodiments. Different technical features optimized based on various embodiments may be combined to form some embodiments as long as the features do not conflict with each other. For brevity, details of the optimized embodiment are omitted herein.

What is described above is merely optional embodiments of this application, but not intended to limit this application. To a person skilled in the art, various modifications and variations may be made to this application. Any modifications, equivalent replacements, improvements, and the like made without departing from the spirit and principles of this application still fall within the protection scope of claims of this application.

What is claimed is:

1. A camera module, comprising a camera, a first bracket, a second bracket, a first driving portion, and a second driving portion, wherein
the camera is disposed on the first bracket, the first driving portion is located on the second bracket and connected to the camera, the second driving portion is connected to the first bracket, and the first bracket is rotatably connected to the second bracket; and
the first driving portion is able to drive the camera to rotate around a first axis relative to the first bracket; the second driving portion is able to drive the first bracket and the camera to rotate around a second axis relative to the second bracket; and the first axis and the second axis are non-coplanar straight lines or intersecting straight lines.

2. The camera module according to claim 1, wherein the second bracket comprises a first accommodation groove; and the first driving portion is located in the first accommodation groove; and
the first driving portion is able to rotate around the second axis along with the first bracket, so as to move into the first accommodation groove or move out of the first accommodation groove through an opening of the first accommodation groove.

3. The camera module according to claim 1, wherein the camera is rotatably in fit with the first bracket through a connecting block, the connecting block comprises a base mounted on the camera and a first hinge shaft disposed on the base, and the first bracket is provided with a first connecting hole;
the first hinge shaft is rotatably in fit with the first connecting hole, and connected to the first driving portion by passing through the first connecting hole; and
the first driving portion drives, through the first hinge shaft, the camera to rotate around the first axis.

4. The camera module according to claim 3, wherein the first bracket is further provided with an arcuate hole, the connecting block further comprises a second hinge shaft fixed onto the base, the second hinge shaft is slidably in fit with the arcuate hole, and the second hinge shaft is in limiting fit with two ends of the arcuate hole.

5. The camera module according to claim 3, wherein the first bracket is further provided with a second connecting hole, the second connecting hole is disposed coaxial with the first connecting hole, and the camera is provided with a third connecting hole;
the camera further comprises a third hinge shaft, the third hinge shaft is coaxial with the first hinge shaft, and the third hinge shaft and the first hinge shaft are located on two opposite sides of the camera respectively; and
the third hinge shaft passes through the second connecting hole and the third connecting hole, and the first bracket is rotatably in fit with the camera through the third hinge shaft.

6. The camera module according to claim 3, wherein the camera is provided with a mounting hole, and the base is fixed in the mounting hole.

7. The camera module according to claim 1, wherein the second driving portion comprises a first driving motor, a first connecting shaft, and an I-shaped bracket; the first driving motor is connected to the first connecting shaft; and the I-shaped bracket is fixed onto the first connecting shaft and connected to a bottom of the first bracket.

8. The camera module according to claim 7, wherein the camera module further comprises a third bracket and a third driving portion; the second bracket is disposed on the third bracket and connected to the third driving portion; the third driving portion drives the second bracket to rotate around a third axis relative to the third bracket; the camera is able to rotate around the third axis along with the second bracket; the third axis is coaxial with an optical axis of the camera; and every two of the first axis, the second axis, or the third axis are non-coplanar straight lines or intersecting straight lines.

9. The camera module according to claim 8, wherein at least two rolling bodies are disposed between the third bracket and the second bracket; and
the second bracket is rotatably connected to the third bracket through the at least two rolling bodies.

10. The camera module according to claim 9, wherein the second bracket or the third bracket is provided with at least two second accommodation grooves, and each of the rolling bodies is disposed in one of the second accommodation grooves.

11. The camera module according to claim 8, wherein the camera module further comprises a fixing base; the third bracket is mounted on the fixing base; the first driving motor is connected by transmission to the first connecting shaft through a hinge; a hinge axis of the hinge is parallel to an optical axis direction of the camera; the first driving motor is fixed onto the fixing base, and is located outside the third bracket; the third bracket is provided with a first strip-shaped avoidance hole; the hinge passes through the first strip-shaped avoidance hole, and is connected to the first connecting shaft located in the third bracket; and the hinge deforms when the second bracket rotates around the optical axis of the camera, or the hinge deforms when the first bracket rotates around the second axis.

12. The camera module according to claim 11, wherein the fixing base is a housing structure, the fixing base comprises a first housing portion and a second housing portion, the first housing portion is docked to the second housing portion to form an accommodation cavity, the third bracket is located in the accommodation cavity, the second bracket is located in the third bracket, and the first bracket is located in the second bracket.

13. The camera module according to claim 12, wherein the first housing portion is provided with a second strip-shaped avoidance hole, a supporting platform is disposed on an outer side of the first housing portion, the supporting platform is covered with a protective cover, the first driving motor is located inside the protective cover, and the hinge passes through the second strip-shaped avoidance hole and the first strip-shaped avoidance hole sequentially to get connected to the first connecting shaft.

14. The camera module according to claim 8, wherein the third driving portion comprises a second driving motor, a second connecting shaft, and a gear mechanism; the gear mechanism comprises a first bevel gear, a second bevel gear, and a third gear; the first bevel gear is disposed on the second connecting shaft; a third connecting shaft coaxial with the third axis is rotatably disposed on the fixing base; and the second connecting shaft is perpendicular to the third connecting shaft;
the second bevel gear and the third gear are fixed to each other, and are both rotatably connected to the third connecting shaft, the first bevel gear meshes with the second bevel gear, an inner ring gear is disposed on the third bracket, and the third gear meshes with the inner ring gear; and
the second driving motor drives, through the second connecting shaft, the gear mechanism to rotate, and in turn, drives, through the third gear, the third bracket to bring the camera to rotate around the optical axis of the camera.

15. An electronic device, comprising a camera module, wherein the camera module comprises a camera, a first bracket, a second bracket, a first driving portion, and a second driving portion;
the camera is disposed on the first bracket, the first driving portion is located on the second bracket and connected to the camera, the second driving portion is connected to the first bracket, and the first bracket is rotatably connected to the second bracket; and
the first driving portion is able to drive the camera to rotate around a first axis relative to the first bracket; the second driving portion is able to drive the first bracket and the camera to rotate around a second axis relative to the second bracket; and the first axis and the second axis are non-coplanar straight lines or intersecting straight lines.

16. The electronic device according to claim 15, wherein the second bracket comprises a first accommodation groove; and the first driving portion is located in the first accommodation groove; and
the first driving portion is able to rotate around the second axis along with the first bracket, so as to move into the first accommodation groove or move out of the first accommodation groove through an opening of the first accommodation groove.

17. The electronic device according to claim 15, wherein the camera is rotatably in fit with the first bracket through a connecting block, the connecting block comprises a base mounted on the camera and a first hinge shaft disposed on the base, and the first bracket is provided with a first connecting hole;
the first hinge shaft is rotatably in fit with the first connecting hole, and connected to the first driving portion by passing through the first connecting hole; and
the first driving portion drives, through the first hinge shaft, the camera to rotate around the first axis.

18. The electronic device according to claim 17, wherein the first bracket is further provided with an arcuate hole, the connecting block further comprises a second hinge shaft fixed onto the base, the second hinge shaft is slidably in fit with the arcuate hole, and the second hinge shaft is in limiting fit with two ends of the arcuate hole.

19. The electronic device according to claim 17, wherein the first bracket is further provided with a second connecting hole, the second connecting hole is disposed coaxial with the first connecting hole, and the camera is provided with a third connecting hole;
the camera further comprises a third hinge shaft, the third hinge shaft is coaxial with the first hinge shaft, and the third hinge shaft and the first hinge shaft are located on two opposite sides of the camera respectively; and
the third hinge shaft passes through the second connecting hole and the third connecting hole, and the first bracket is rotatably in fit with the camera through the third hinge shaft.

20. The electronic device according to claim 17, wherein the camera is provided with a mounting hole, and the base is fixed in the mounting hole.

* * * * *